Nov. 14, 1967     S. J. JABLONSKY     3,352,016
GUIDE FIXTURE
Filed May 19, 1965     3 Sheets-Sheet 1
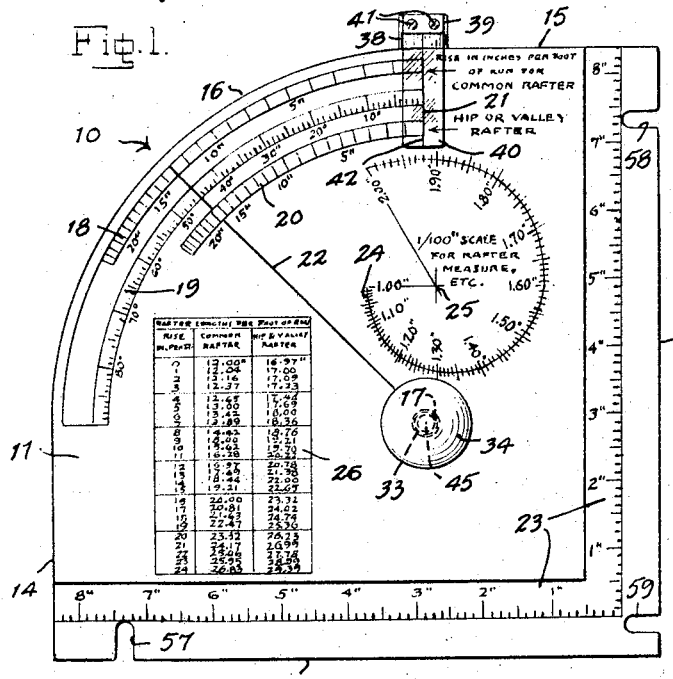
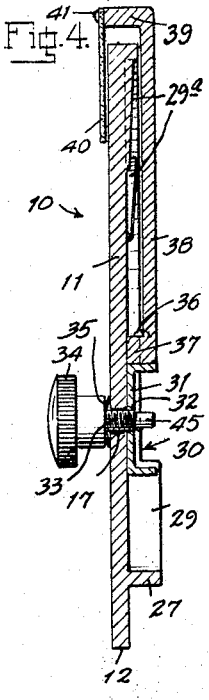
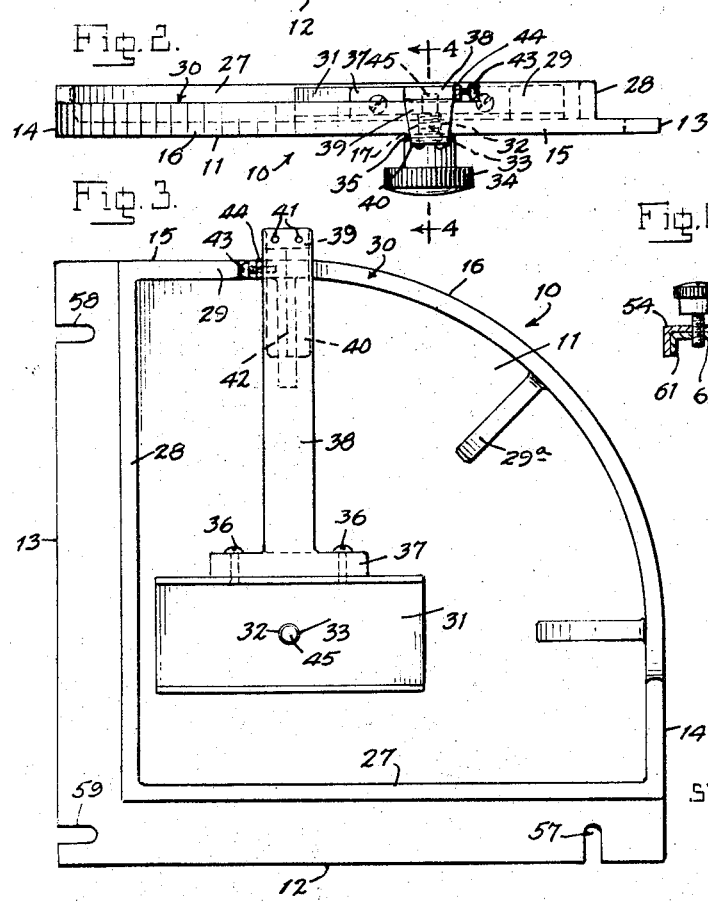
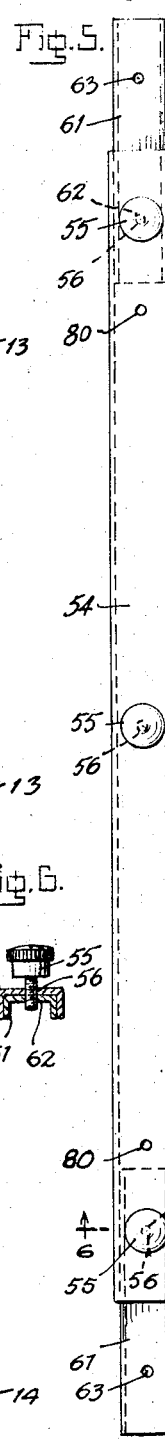
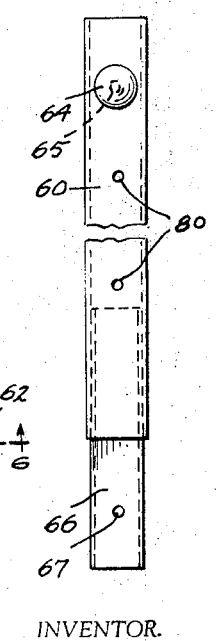
INVENTOR.
STEPHEN J. JABLONSKY
BY
ATTORNEY Nov. 14, 1967  S. J. JABLONSKY  3,352,016
GUIDE FIXTURE
Filed May 19, 1965  3 Sheets-Sheet 2
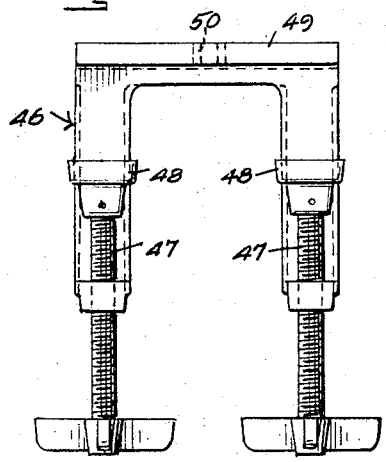
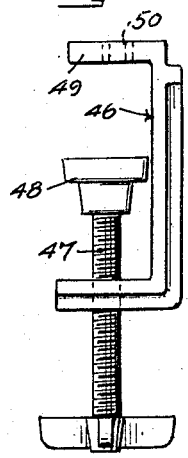
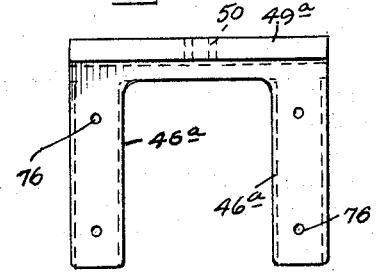
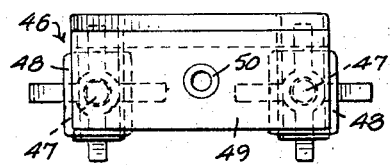
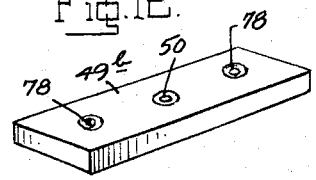
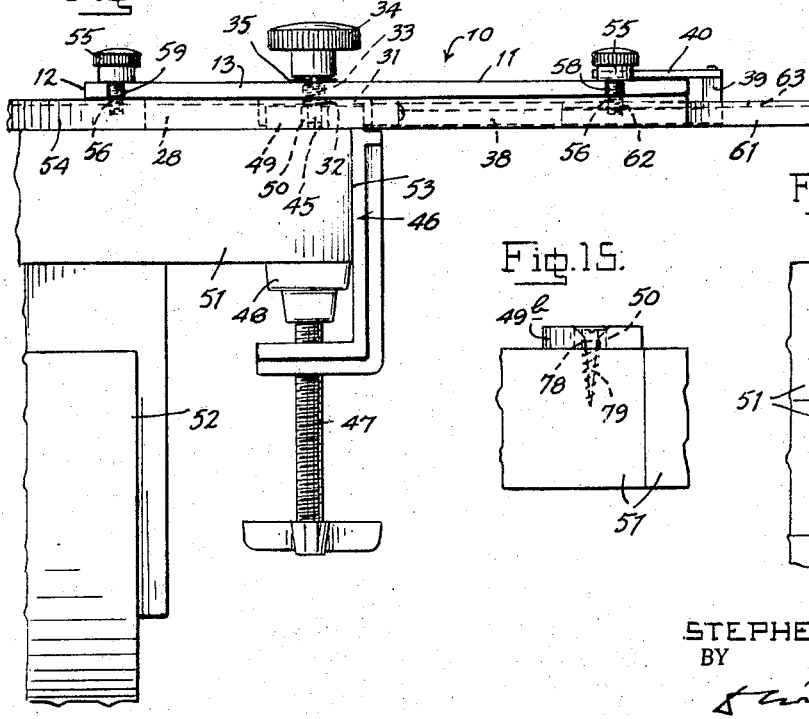
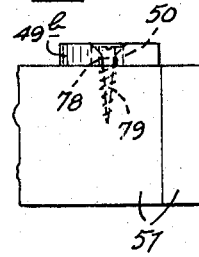
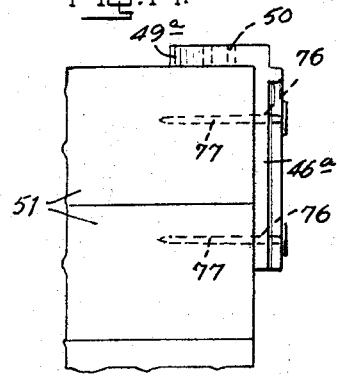
INVENTOR.
STEPHEN J. JABLONSKY
BY
ATTORNEY Nov. 14, 1967   S. J. JABLONSKY   3,352,016
GUIDE FIXTURE
Filed May 19, 1965                                3 Sheets-Sheet 3
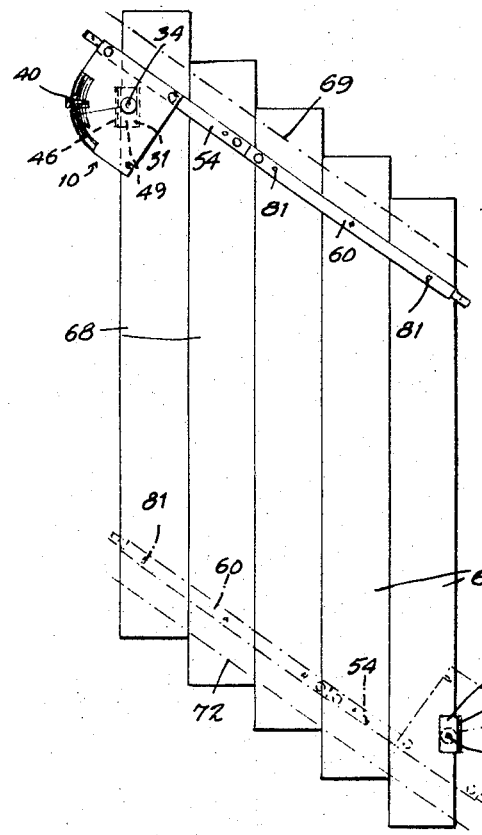
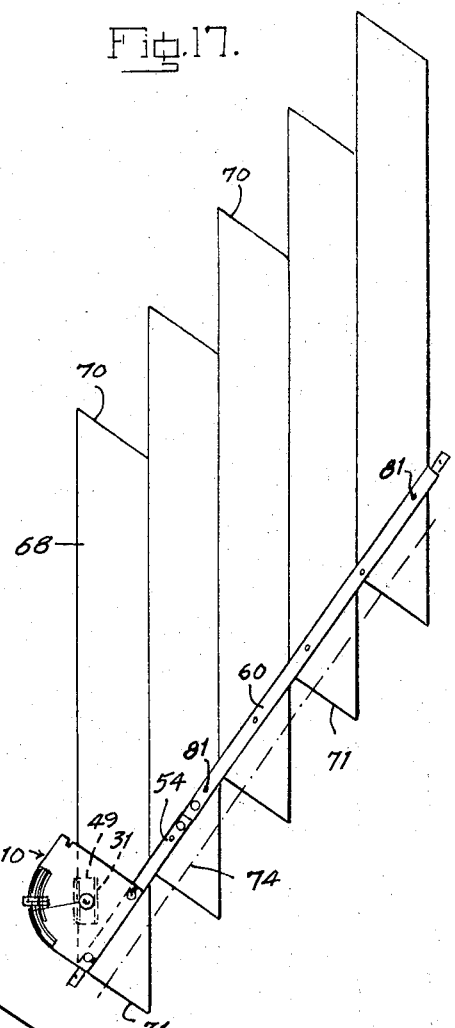
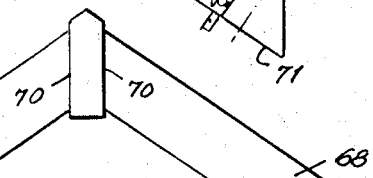
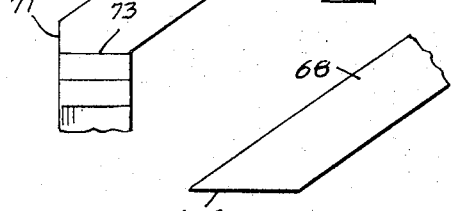
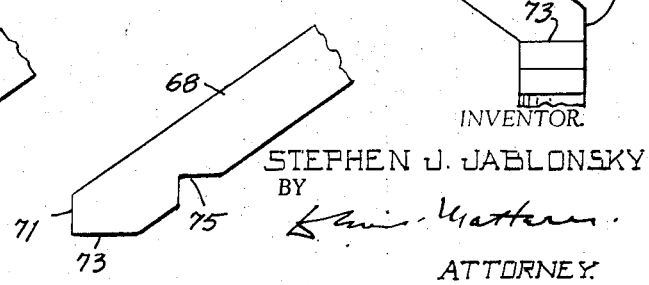
INVENTOR.
STEPHEN J. JABLONSKY
BY
ATTORNEY

United States Patent Office 3,352,016
Patented Nov. 14, 1967

3,352,016
GUIDE FIXTURE
Stephen J. Jablonsky, 120 Rosebrook Drive,
Stratford, Conn. 06075
Filed May 19, 1965, Ser. No. 456,948
13 Claims. (Cl. 33—75)

This invention relates to a guide fixture, particularly for the marking or sawing of timber, panels, siding or other such building materials which require the accurate marking or cutting of the end or other edges of such material along lines which are either square or at an inclined angle to a reference line, such reference line for example being a straight longitudinal edge of such material.

An object of the invention is to provide a guide fixture which may be readily mounted on the material to be marked or cut in accurately positioned relation to said reference line and which includes an angularly adjustable plate having two edges arranged in right-angular relation to each other and in identical relation to the axis of angular adjustment, whereby through angular adjustment the angle of one of said edges in relation to the reference line will be the complementary angle to the angle of the other edge in relation to the reference line.

Another object is to provide a guide bar and extensions therefor which may be selectively secured in parallel relation to either of the right angular related edges of the angularly adjustable plate, to thus provide marking or cutting guides of any desired length to extend for example across a succession of rafter timbers or the like arranged in side-by-side relation, or across superimposed panel boards or similar types of material of relatively great width. The guide fixture thus lends itself to the simultaneous marking or cutting of a large number of pieces of material requiring identical cuts, for example rafter timbers having complementary plumb and seat cuts at their respective ends.

Another object is to provide a fixture including detachable positioning means for fixed mounting in parallel relation to a reference line of the material to be cut, and to which the angularly adjustable plate of the fixture may be readily interengaged in a pre-set position of angular adjustment relative to said reference line, it being proposed to provide a plurality of such detachable positioning means which may be mounted at desired locations upon the material to be cut, enabling the angularly adjustable plate to be selectively interengaged with any one of such positioning means without disturbing its angular setting. Thus, for example, one such positioning means may be secured in relation to one end of one or a plurality of rafter timbers, while another such attachment may be secured in relation to the other end. Thereupon, with the angularly adjustable plate interengaged with one positioning means, an angular plumb cut may be made at one end and, upon transfer of the plate to the other positioning means, a complementary angular seat cut may be made at the other end.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

FIG. 1 is a plan view of the front or upper side of the plate part of the guide fixture according to the invention;

FIG. 2 is an edge or side elevation looking down upon the fixture as seen in FIG. 1;

FIG. 3 is a plan view of the rear or underside of the plate part;

FIG. 4 is a sectional view taken along the line 4—4 of FIG. 2;

FIG. 5 is a plan view of a guide bar shown in its detached relation to the plate part;

FIG. 6 is a transverse sectional view taken along the line 6—6 of FIG. 5;

FIG. 7 is a plan view, partially broken away, of an extension guide bar for connection to the guide bar as seen in FIG. 5;

FIG. 8 is a front elevation of a positioning member of C-clamp type shown in its detached relation with respect to the plate part of the fixture;

FIG. 9 is an end elevation;

FIG. 10 is a top plan view;

FIG. 11 is a front elevation of a modified positioning member of angle type for nailing or screwing to the edge of a timber or the like;

FIG. 12 is a perspective view of another modified form of positioning member for nailing or screwing to a horizontal surface of a timber or the like.

FIG. 13 is a fragmentary end elevation showing the guide fixture of the invention mounted upon the edge of a timber by means of the C-clamp type of positioning means shown in FIGS. 8–10;

FIG. 14 is a fragmentary end elevation showing a plurality of stacked timbers or the like with a positioning means of the type shown in FIG. 11 secured thereto;

FIG. 15 is a fragmentary end elevation of a timber having the positioning means as shown in FIG. 12 secured thereto;

FIG. 16 is a plan view showing a plurality of side-by-side rafter timbers arranged in staggered relation with the guide fixture mounted thereon in position to guide a portable saw in making an angular plumb cut at one end of the timbers, and showing additional positioning means mounted thereon for positioning the fixture to produce a plumb cut at the other end of the timbers;

FIG. 17 is a plan view showing the timbers with the plumb cuts as produced in FIG. 16 with the fixture in place and the timbers arranged in staggered relation to produce an angular seat cut in complementary relation to the plumb cuts;

FIG. 18 is a side elevation showing rafters assembled in a roof frame and having plumb and seat cuts produced by the procedures illustrated in FIGS. 16 and 17;

FIG. 19 is a fragmentary side elevation showing a modified form of a seat cut; and FIG. 20 is a similar view showing another modified form of seat cut wherein the rafter has an eave extension.

Referring to the drawings, the guide fixture according to the exemplary embodiment of the invention illustrated therein comprises a plate part 10, FIGS. 1–4, preferably formed of lightweight metal, for example cast aluminum alloy, having a horizontal planar top wall 11 having various indicia inscribed upon its upper face as will presently more fully appear, and having right angularly related straight equal length edge surfaces 12 and 13 extending along the lower edge and one side edge, a straight edge surface 14 extending along the other side edge at right angles to and adjoining the lower edge surface 12, a straight upper edge surface 15 extending along the upper edge at right angles to and adjoining the side edge surface 13, and a curved edge surface 16 joining the edge surfaces 14 and 15, and which is concentric to a cylindrical hole 17 centered upon a line disposed at a 45° angle to the edge surfaces 12 and 13 and intersecting the corner formed by the edge surfaces 12 and 13. The hole 17 constitutes a pivot point for an index means with respect to which the plate part is angularly adjustable, as will presently more fully appear.

In concentric relation to the hole 17 and adjacent the curved edge surface 16, there are provided a series of concentric scale markings 18, 19 and 20 comprising a combination scale having a common zero index line 21 disposed radially of the hole 17 and in parallel relation to the side edge surface 13. The scale 18 is a tangential scale calculated with reference to rise in inches per foot of run for determining angular plumb and seat cuts of common rafters, the scale 19 is a degree scale calibrated from 0° to 90° and the scale 20 is a tangential scale calculated with reference to rise in inches per foot of run for hip or valley rafters. A 45° angle index line 22 extends radially from the hole 17 through the 45° marking of the degree scale 19, as well as the 12″ marking of the scale 18. Thus, in the case of a common rafter having a 12″ rise per foot of run, the cutting angle for both plumb and seat cuts would be 45°.

In addition to the angle determining scale the plate part may also have inscribed thereon a square scale 23 calibrated in inches and extending in parallel relation to the edge surfaces 12 and 13, a 1/100″ scale 24, preferably of spiral form, from which measurements may be taken by calipers superimposed between the reference center point 25 and the desired scale marking, and a rafter table 26 for determining rafter lengths per foot of run in relation to rise in inches per foot of run for both common rafters and hip and valley rafters. The scales 23 and 24 and the rafter table 26 provide very convenient at-hand means to enable the carpenter or other craftsman to readily plot and calculate the length of rafters and the angles at which plumb and seat cuts are to be made through the use of the guide fixture.

On the under side of the top wall 11 of the plate part and in inwardly spaced parallel relation to the edge surfaces 12 and 13 there are provided integral rib-like walls 27 and 28 which provide abutment means for a guide bar attachment, as will presently more fully appear. The walls 27 and 28 are adapted to engage the surface of the material to be cut and to thus space the underside of the top wall from the material surface, for a purpose presently to more fully appear. An integral rib-like wall 29 extends from the outer ends of the walls 27 and 28 along the side and top edge surfaces 14 and 15 and the curved surface 16 and is recessed intermediate its ends along the curved edge surface 16 and for a short distance along each of the edge surfaces 14 and 15 to provide a clearance space 30 for movement of a part of the indexing means associated with the plate part, as will presently more fully appear. The walls 27, 28 and 29 also serve to provide stiffening reinforcement for the top wall 11, such reinforcement being additionally provided by a series of integral radial ribs 29a extending inwardly from the wall 29.

At the under side of the top wall 11 of the plate part 10 within the space defined by the walls 27, 28 and 29, there is provided a pocket member 31 preferably formed of a strip of channel stock of aluminum alloy or the like having a height dimension along its side flanges slightly less than the depth of the space defined by the walls 27, 28 and 29 so that when these walls rest upon the surface of the material to be cut the flange edges of the pocket member will be free of contact therewith. Centrally of the pocket member there is provided a threaded hole 32 in register with the hole 17 of the top plate 11 and into which is screwed the threaded shank 33 of a knob member 34, a spring washer 35 being interposed between the knob member and the upper surface of the top plate 11. Upon tightening of the knob 34 the position of the pocket member 31 is rigidly fixed relative to the plate part and upon loosening of the knob the plate part may be rotated relatively to the pocket member.

Upon one side flange of the pocket member there is secured by screws 36—36 the transverse base 37 of a radial arm 38 disposed at a right angle to the longitudinal axis of the pocket member 31 and which extends therefrom in parallel relation beneath the top wall and outwardly through the clearance space 30. At the outer end of the arm 38 there is provided an upstanding lug portion 39 outwardly spaced from the wall 29 and upon the upper end of which an index plate 40 is secured by screws 41—41. The index plate is preferably formed of transparent rigid plastic material and is provided with a centrally disposed radial index line 42 which overlies the scales 18, 19 and 20, and which in the position as shown in FIGS. 1 and 3, wherein the longitudinal axis of the pocket member 31 is parallel to the wall 27 and the arm 38 is parallel to the wall 28 registers with the zero marking 21 of the scales. In order to insure accurate registry of the index markings 42 and 21 an adjustable set screw 43 is provided at one side of the arm 38 and in the registered position of the index markings its head abuts the end wall of the space 30 adjacent the markings. A lock nut 44 engaged upon the set screw serves to fix its position of adjustment. Upon the end of the threaded shank 33 of the knob 34 there is provided a cylindrical pilot stud 45 for positioning engagement in the positioning means with which the pocket member 31 of the plate part is adapted to be removably engaged, as will presently more fully appear.

As hereinbefore indicated the positioning means is adapted to be rigidly secured at a predetermined reference position upon the material to be cut. As shown in FIGS. 8–10 one form of positioning means comprises a clamp 46 of generally C-clamp type and preferably provided with a pair of tightening screws 47—47 having swivel heads 48—48 opposed to a rectangular block portion 49 constituting the upper jaw of the clamp. This block portion is dimensioned to correspond to the internal width and length of the channel pocket member 31 and is provided centrally with a cylindrical bushing 50 dimensioned to snugly receive the pilot stud 45 of the knob 34, to thus accurately fix the position of the plate part relatively to the positioning means, and, upon loosening of the knob 34, to permit angular adjustment of the plate part relatively to the block portion 49 of the clamp and the pocket member 31 engaged therewith.

As seen in FIG. 13 the clamp is adapted to be secured upon the material to be marked or cut, illustrated for example as a length of timber 51 supported upon horses 52, the block portion 49 being engaged with the upper side of the timber with its longitudinal axis parallel to the longitudinal edge 53 of the timber, which edge constitutes the reference line with respect to which the plate part of the guide fixture is adapted to be angularly adjusted.

In the operation of the fixture a guide bar 54, shown in detail in FIGS. 5 and 6, is adapted to be secured along either of the straight edge surfaces 12 and 13 of the plate part in abutting relation with one or the other of the respective walls 27 and 28. The guide bar is preferably formed of channel stock of aluminum alloy or the like, having a width dimension corresponding to the inward spacing of the walls 27 and 28, a depth dimension corresponding to the height of the walls 27 and 28, and a length approximately twice that of one straight edge of the top plate. Centrally of the bar and adjacent its opposite ends there are provided headed clamping screws 55 engaged in threaded holes 56 in the bar. In the edge surfaces 12 and 13 of the plate part there are provided inwardly extending notches 57 and 58 adjacent the respective outer ends and a notch 59 in the corner of the edge surfaces, the spacing of these notches corresponding to the spacing of the clamping screws 55, so that in one mounting position of the guide bar the central clamping screw and one end clamping screw may be engaged in the notches 59 and 57, and by tightening of the clamping screws secured along the straight edge surface 12 with approximately half the length of the guide bar extending from the plate part. In another position the central clamping screw and one end clamping screw may be engaged with the notches 59 and 58 to secure the bar along the straight edge surface 13. The bar being symmetrical it may of course be engaged with either side inwardly and with either pair of clamping screws engaged with a pair of the notches.

In order to extend the length of the guide bar extension bars 60 as shown in FIG. 7 may be provided of any suitable length. In order to connect the extension bars to the guide bar a channel strip tongue member 61 is secured as by welding in each end of the guide bar and is provided with a threaded hole 62 in register with the clamping screw receiving hole 56 of the guide bar and with a threaded hole 63 in its projected end. The extension bar is provided with a headed clamping screw 64 engaged in a threaded hole 65 adjacent one end, and this end of the extension bar is adapted to be engaged with the tongue member at either end of the guide bar and secured by screwing the clamping screw 64 into the threaded hole 63 of the tongue. At the opposite end from the clamping screw 64 the extension bar is provided with a welded channel strip tongue member 66 similar to the tongue members 61 and provided with a threaded hole 67 in its projecting portion. Thus a plurality of similar extension bars of the same or different lengths may be connected together to provide in conjunction with the guide bar 54 a marking or cutting guide of any desired length.

While many types of straight and angular cuts may be made in various types of material, as will be obvious, there is illustrated by way of example the procedure in producing plumb and seat cuts at the ends of roof rafters 68 of the type as shown in FIG. 18. As shown in FIG. 16 a plurality of such rafters may be simultaneously cut by arranging them in side-by-side relation upon suitable supports. After calculating the length of the rafters a positioning clamp is secured upon the outer edge of one outside rafter, and, if a plumb cut of corresponding angle is to be produced at the other ends of the rafters, a positioning clamp is secured at a predetermined position upon the outer edge of the other outside rafter. Thereupon the plate part 10 of the fixture is placed upon the block portion 49 of one of the clamps and is set at the desired cutting angle, with the guide bar secured along one straight edge, and with an extension bar of suitable length connected thereto to extend entirely across the rafters. The rafters are arranged in staggered position roughly corresponding to the cutting angle. The broken line 69 in FIG. 16 indicates the cutting line of the saw, for example a portable circular saw, which may be guided along the guide bar, it being pointed out that the saw cutting line is spaced a given distance from the guide edge of the saw, such spacing being taken into consideration in positioning the fixture. By cutting along the line 69 a plumb cut 70 as seen in FIG. 18 is produced, this cut being at a 35° angle in the illustrated example.

In this illustrated example a corresponding plumb cut 71 is to be produced at the other end of the rafter and this is accomplished simply by removing the plate part from the block portion of one clamp, without changing its angular setting, and transferring it to the block portion of the other clamp, as indicated by the broken lines in FIG. 16, whereupon the saw cut may be made along the line 72 to produce the plumb cut 71. In order to produce the seat cut 73 which is at a complementary angle to the 35° angle of the plumb cuts, i.e., a complementary angle of 55°, the rafters are arranged as seen in FIG. 17, with the positioning clamp secured upon the outer rafter adjacent the end upon which the seat cuts are to be made. Thereupon without changing the angular setting of the plate part, but with the guide bar secured along its other straight edge, the plate part is engaged with the block portion of the positioning clamp. Thereupon the saw cut may be made along the cutting line 74 to produce the seat cuts 73.

In FIGS. 19 and 20 there are illustrated variations of seat cuts. In FIG. 19 the seat cut 73a extends entirely across the rafter, the plumb cut 71 as in FIG. 18 being omitted. In FIG. 20 wherein the rafter includes an eave extension having vertical and horizontal cuts 71 and 73 similar to those shown in FIG. 18, the plate engaging cut is in the form of a bird-mouth notch 75 of right-angular form. Obviously many other types and arrangements of cuts may be conveniently made by the use of the guide fixture of the invention in rafters and other types of material.

In the case of simultaneously cutting stacked timbers 51 of such combined thickness that it is impractical to employ the C-clamp type of positioning member, a positioning member as seen in FIGS. 11–14 may be employed comprising a block portion 49a similar to the block portion 49 of the C-clamp type having right-angularly extending legs 46a to engage the end edges of the stacked timbers. Nail or screw receiving holes 76 are provided in the legs whereby the positioning member may be secured to the timbers as by driving nails 77 therein.

Where it is desired to provide the positioning means upon the upper surface of timbers 51 arranged in side-by-side relation, but with the positioning member spaced inwardly from an exposed edge, a positioning member in the form of a rectangular block 49b may be employed, this block being similar to the block portion 49 of the C-clamp type positioning member, and being provided in addition to the pilot stud receiving bushing 50 with countersunk nail or screw receiving holes 78 which enables the member to be secured to the upper surface of the timber as by screws 79.

In order to stabilize the outboard ends of the guide bar 54, and the extension bar 60 connected thereto, suitable spaced nail receiving holes 80 may be provided therein, as shown in FIGS. 5 and 7, to enable the bars to be temporarily secured to the timbers by nails 81 driven therein, as shown in FIGS. 16 and 17. This also serves to tie the side-by-side timbers together to thus prevent accidental shifting or displacement relatively to each other.

What is claimed is:

1. A guide fixture, for cutting or marking a work piece having a straight reference line and a substantially planar top surface, comprising a positioning part having a straight reference line for attachment to said work piece with its said reference line in parallel relation to said reference line thereof, an index part for non-rotatable connection to said positioning part, a plate part for disposition in parallel relation to said top surface of the work piece including means for pivotally connecting said plate part to said index part for angular adjustment about a pivot axis normal to said top surface of the material, said plate part including two straight tool guide side edge surfaces forming a right angle enclosing said pivot axis and arranged so that a 45° line bisecting said right angle coincides with said pivot axis, an angle degree scale carried by said plate part between said side edge surfaces at the opposite side of said pivot axis from the corner of said right angle and arranged in concentric relation to said pivot axis, marker index means carried by said index part disposed in indexing relation to said scale and coinciding with a radial line of said pivot axis disposed at a right angle to said reference line of said positioning part, a straight guide bar, and means for securing said guide bar in parallel relation along either of said side edge surfaces with a portion of said guide bar extending outwardly from the edge surface in relation to which said guide bar is secured.

2. The invention as defined in claim 1, further characterized by a straight extension bar, and means for removably securing said extension bar in end-to-end relation to an end of said guide bar.

3. A guide fixture, for cutting or marking a work piece having a straight reference line and a substantially planar top surface, comprising a positioning part having a straight reference line for attachment to said work piece with its said reference line in parallel relation to said reference line thereof, an index part for non-rotatable connection to said positioning part, a plate part for disposition in parallel relation to said top surface of the work piece including means for pivotally connecting said plate part to said index part for angular adjustment about a pivot axis normal to said top surface of the material, said plate part including two straight tool guide side edge surfaces forming a right angle enclosing said pivot axis and arranged so that a 45° line bisecting said right angle coincides with said pivot axis, an angle degree scale carried by said plate part between said side edge surfaces at the opposite side of said pivot axis from the corner of said right angle and arranged in concentric relation to said pivot axis, marker index means carried by said index part disposed in indexing relation to said scale and coinciding with a radial line of said pivot axis disposed at a right angle to said reference line of said positioning part, a straight guide bar substantially equal in length to the combined lengths of said side edge surfaces and means for securing said guide bar in parallel relation along either of said edge surfaces with substantially half the length of said guide bar projecting therefrom.

4. The invention as defined in claim 3, wherein said means for securing said guide bar comprises three equally spaced notches, one in each of said side edge surfaces adjacent its outer end and one in the corner between said side edge surfaces, and correspondingly equally spaced headed clamping screws carried by said guide bar for engagement in said notches to clamp said guide bar to said plate part in parallel relation to said respective side edge surfaces with the centrally positioned clamping screw engaged in said corner notch and one or the other of the other clamping screws engaged in one or the other of the other notches.

5. A guide fixture, for cutting or marking a work piece having a straight reference line and a substantially planar top surface, comprising a positioning part having a straight reference line for attachment to said work piece with its said reference line in parallel relation to said reference line thereof, an index part for non-rotatable connection to said positioning part, a plate part for disposition in parallel relation to said top surface of the work piece including means for pivotally connecting said plate part to said index part for angular adjustment about a pivot axis normal to said top surface of the material, said plate part including two straight tool guide side edge surfaces forming a right angle enclosing said pivot axis and arranged so that a 45° line bisecting said right angle coincides with said pivot axis, an angle degree scale carried by said plate part between said side edge surfaces at the opposite side of said pivot axis from the corner of said right angle and arranged in concentric relation to said pivot axis, marker index means carried by said index part disposed in indexing relation to said scale and coinciding with a radial line of said pivot axis disposed at a right angle to said reference line of said positioning part, said plate part comprising a planar top wall and a pair of downwardly projecting straight wall portions at the under side of said top wall in parallel inwardly spaced relation to said respective side edge surfaces, the lower edges of said wall portions being parallel to said top wall to support said top wall upon said work piece in spaced relation to said work piece.

6. The invention as defined in claim 5 further characterized by a straight guide bar at least as wide as the inward spacing of said wall portions, and means for securing said guide bar in parallel relation along either of said side edge surfaces in abutting relation with a respective wall portion with a portion of said guide bar extending outwardly from the edge surface in relation to which said guide bar is secured.

7. A guide fixture, for cutting or marking a work piece having a straight reference line and a substantially planar top surface, comprising a positioning part having a straight reference line for attachment to said work piece with its said reference line in parallel relation to said reference line thereof, an index part for non-rotatable connection to said positioning part, a plate part for disposition in parallel relation to said top surface of the work piece including means for pivotally connecting said plate part to said index part for angular adjustment about a pivot axis normal to said top surface of the material, said plate part including two straight tool guide side edge surfaces forming a right angle enclosing said pivot axis and arranged so that a 45° line bisecting said right angle coincides with said pivot axis, an angle degree scale carried by said plate part between said side edge surfaces at the opposite side of said pivot axis from the corner of said right angle and arranged in concentric relation to said pivot axis, marker index means carried by said index part disposed in indexing relation to said scale and coinciding with a radial line of said pivot axis disposed at a right angle to said reference line of said positioning part, said positioning part including a rectangular block portion and said index part including a channel strip member having parallel side flanges providing a pocket in which said block portion is received in non-rotatable relation.

8. The invention as defined in claim 7, further characterized by C-clamp means for clamping about the reference edge of a work piece, and wherein said block portion constitutes the upper jaw of said C-clamp means.

9. The invention as defined in claim 7, further characterized by a right-angularly extending leg carried by said block portion for engagement with and securing to an edge surface of said work piece by nails, screws or the like.

10. The invention as defined in claim 7, wherein said block portion has nail or screw receiving holes for securing to the planar surface of said work piece by nails, screws or the like.

11. The invention as defined in claim 7 wherein said plate part has a bearing hole coaxial with said pivot axis, and said channel strip member has a threaded hole coaxial with said bearing hole, and further characterized by a shouldered knob member having a threaded shank for engagement through said bearing hole into threaded engagement with said threaded hole whereby upon tightening of said knob member said channel strip member is clamped against rotation with respect to said plate part and upon loosening of said knob member said plate part is free to be angularly adjusted about said pivot axis with respect to said channel strip member.

12. The invention as defined in claim 11, further characterized by a pilot stud extension on said threaded shank, and socket means in said block portion of said positioning means in which said pilot stud is received to fix said channel strip member against lateral movement relatively to said block member.

13. The invention as defined in claim 7, further characterized by an index arm extending from said channel strip member in radial relation to said pivot axis beneath said top wall beyond its periphery, and marker index means carried upon the outer end of said arm and overlying said angle degree scale.

References Cited
UNITED STATES PATENTS

| | | | |
|---|---|---|---|
| 1,091,978 | 3/1914 | Spies | 33—93 |
| 1,789,125 | 1/1931 | Wilderson | 33—79 X |
| 2,923,709 | 2/1958 | Konieczka | 33—75 X |

HARRY N. HAROIAN, *Primary Examiner.*

LEONARD FORMAN, *Examiner.*